Aug. 7, 1956   G. A. LYON   2,757,986
WHEEL COVER
Filed Oct. 12, 1953
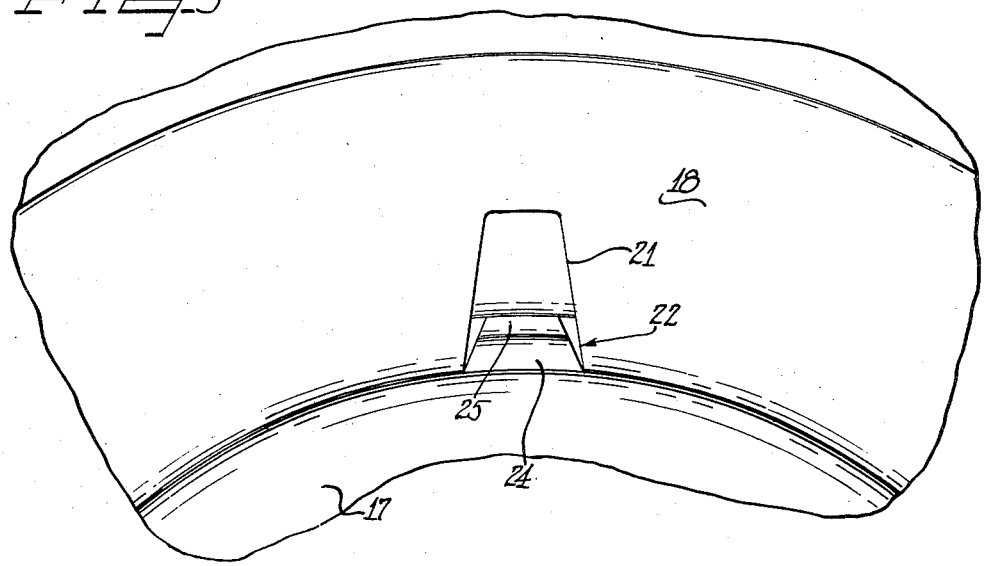
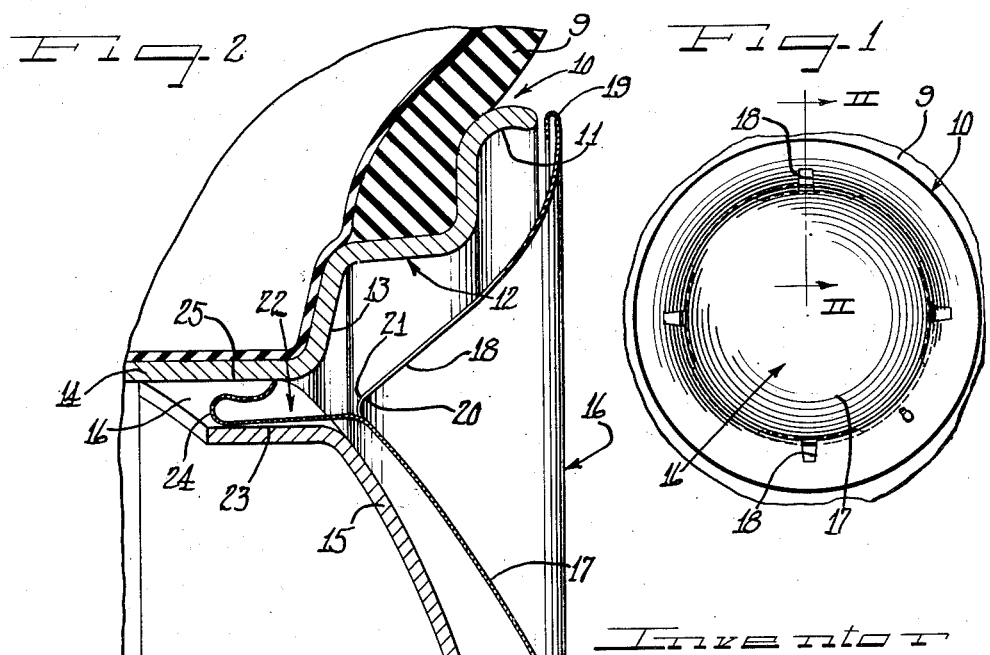
Inventor
George Albert Lyon

United States Patent Office 2,757,986
Patented Aug. 7, 1956

2,757,986

WHEEL COVER

George Albert Lyon, Detroit, Mich.

Application October 12, 1953, Serial No. 385,475

6 Claims. (Cl. 301—37)

This invention relates to wheel covers and more particularly to a self-retaining automobile wheel cover.

An object of this invention is to provide an improved and simplified form of automobile wheel cover having, as integral components thereof, spaced cover retaining fingers depressed out of the material of the cover itself.

Another object of this invention is to provide a cover in which fingers are formed from the cover leaving spaced ornamental openings in the cover.

In accordance with the general features of this invention, there is provided in a cover structure for a wheel, a wheel cover comprising a circular member having an annular dished portion defined by divergent cover portions, the cover at the dished portions having a plurality of circularly spaced rearwardly extending cover retaining fingers deflected out of the material of one of the portions leaving spaced openings in the portion, each of the fingers including an axially extending resilient leg and an extremity turned back over the leg terminating in an angular edge portion for gripping engagement with the wheel in a wheel opening.

Other objects and features of this invention may more fully appear from the following detailed description taken in connection with the accompanying drawings which illustrate a single embodiment thereof and in which—

Figure 1 is a fragmentary side view of a wheel having applied thereto the cover of this invention;

Figure 2 is an enlarged fragmentary cross-sectional view taken on substantially the line II—II of Figure 1 looking in the direction indicated by the arrows; and Figure 3 is an enlarged fragmentary front view of a portion of the cover showing the formation of the fingers therefrom through the openings left in the cover.

As shown on the drawings:

The cover of my invention is applicable to a conventional wheel such as is commonly used in the automotive industry. Such a wheel includes a tire and tube assembly designated generally by the reference character 9 (Fig. 2) mounted upon a conventional multi-flanged drop-center tire rim 10. This tire rim includes a terminal flange 11, generally axially and radially extending flanges 12 and 13, and a base flange 14.

Also, as is well known, such a tire rim is usually carried on a dished metallic body or load supporting member 15 attached at spaced intervals to the rim base flange 14 leaving spaced air circulating openings 16 through which air can circulate for assisting in cooling the wheel or parts thereof (not shown) such as a brake drum.

Cooperable with this wheel is a sheet metal cover 16 which may be made in any suitable manner such, for example, as from a punched press stamping. It includes divergent circular portions including a central crown portion 17 and an outer annular portion 18 terminating in a turned pry-off edge 19. These portions are divergently related and define an annular dished area in the cover, the bottom of which comprises an intermediate annular portion 20 at the junction of the two portions 17 and 18.

It will be noted that the turned edge 19 as well as the central crown portion 17 are spaced from the wheel as it is intended here that the wheel cover should be floatingly carried on the wheel by the cover retaining spring fingers 22 embodying the features of this invention.

The fingers 22 may be of any suitable number and are arranged in a common circle circumferentially of the cover. Since they are all identical, a description of one will suffice for all. Each finger 22 is depressed and formed from the material of the cover and more particularly from the portions 18 and 20 leaving spaced ornamental wedge-shaped openings 21 in the cover. These openings may be used, if it is so desired, for the purpose of assisting in the circulation of air through the wheel openings 16 as well as ornamenting the cover.

Each of the fingers 22 includes a relatively long axially extending leg 23 projecting generally axially inwardly or rearwardly from the junction portion 20 and terminating in a return bent portion 24 including a generally axially outwardly extending terminal leg turned back into spaced relation over the leg 23. The bent portion 24, in turn, terminates in an angular short and stiff extremity 25 extending generally radially and axially outwardly and having its tip edge arranged for gripping engagement with one of the flanges, herein the base flange 14, inside of the wheel opening 16. Also, by virtue of each finger being projected from a wedge-shaped opening, its side edges are inclined or converge toward each other.

In the application of the cover 16 to the wheel, it is first placed over the wheel with its fingers 22 aligned with the wheel openings 16 and it is then pressed rearwardly into the space defined by the wheel rim 10. In the course of this movement of the cover, the edges of the angular extremities 25 of the fingers cammingly engage the surface of the base flange 14 inside of the respective wheel openings 16 thereby resiliently stressing the fingers.

It will be appreciated that the edges of the fingers are normally arranged in a circle of a diameter slightly greater than that of the inner circular surface of base flange 14 so as to require flexure of the fingers as they are forced into the wheel openings. In this manner the fingers may be brought into stressed retaining cooperation with the wheel without necessarily subjecting other parts of the cover to any stress or strain.

When it is desired to remove the cover from the wheel, it is easily removable by inserting the end of a pry-off tool under the reinforced turned edge 19 of the cover and by progressively twisting and forcing the cover outwardly to disengage the fingers from their retaining cooperation with base flange 14.

It should be noted that when the fingers 22 are in the wheel openings 16 their engagement with rim flange 14 may be backed up or reinforced by each of the finger legs 23 bearing against wheel body 15 in the opening 16.

I claim as my invention:

1. In a wheel structure including a wheel having joined rim and body flanges with spaced transverse wheel openings at their junction, a wheel cover comprising a circular member having an annular dished portion defined by divergent cover portions, said cover at said dished portions having a plurality of circularly spaced rearwardly extending cover retaining fingers deflected out of the material of one of said portions leaving spaced openings in said portion, each of said fingers including an axially inwardly extending resilient leg and an extremity turned back generally axially outwardly over said leg terminating in an angular generally radially outwardly extending edge portion for gripping engagement with the wheel inside of one of said openings and backed up by said wheel body flange.

2. In a wheel structure including a tire rim and a supporting body member with openings within the wheel adjacent juncture of the rim and body member, a cover for disposition at the outer side of the wheel comprising a cover plate with retaining fingers struck therefrom and extending generally axially inwardly therefrom for projection into the wheel openings, said fingers having generally axially inwardly directed legs with axially outwardly return bent flexible terminal legs provided with short and stiff generally radially extending extremities for retaining engagement at their tips with a generally radially oppositely facing flange at said openings, whereby the cover is retained in press-on pryoff relation by the fingers.

3. In a wheel structure including a tire rim and a wheel body with openings through the wheel adjacent juncture of the rim and wheel body defined at opposite radial sides by spaced apart flanges, a cover for disposition at the outer side of the wheel comprising divergent portions for respectively overlying the tire rim and the wheel body, one of said portions having struck therefrom cover retaining fingers with axially inwardly directed legs engageable against one of the wheel opening flanges and generally axially outwardly directed return bent terminal leg portions spaced from the axially inwardly directed legs less than the spacing between said opening flanges, said axially outwardly directed legs having short generally radially and axially outwardly oblique angular terminals engageable in press-on pryoff relation with the wheel opening flange opposite the flange against which the axially inwardly directed leg engages, whereby to maintain the cover on the wheel in press-on pry-off relation.

4. In a wheel structure including a tire rim and a supporting body member with openings within the wheel adjacent juncture of the rim and body member, a cover for disposition at the outer side of the wheel comprising a cover plate with retaining fingers struck therefrom and extending generally axially inwardly therefrom for projection into the wheel openings, said fingers having generally axially inwardly directed legs with axially outwardly return bent flexible terminal legs provided with short and stiff generally radially extending extremities for retaining engagement at their tips with a generally radially oppositely facing flange at said openings, whereby the cover is retained in press-on pry-off relation by the fingers, the cover plate where the fingers are struck therefrom having openings therethrough which are disposed generally opposite the wheel openings for air circulation through the wheel openings and the cover.

5. In a wheel structure including a tire rim and a supporting body member with openings within the wheel adjacent juncture of the rim and body member, a cover for disposition at the outer side of the wheel comprising a cover plate with circular divergently related portions providing a juncture that projects generally axially inwardly on a diameter that adapts it to be disposed adjacent to said wheel openings, the radially outer of said portions having openings struck therein in general alignment with said wheel openings and with retaining fingers formed from material struck from said openings and extending generally axially inwardly from the juncture as extensions from said radially inner portion for projection into the wheel openings, said fingers having generally axially inwardly directed legs with axially outwardly return bent flexible terminal legs provided with short and stiff generally radially extending extremities for retaining engagement at their tips with a generally radially oppositely facing flange at said openings, whereby the cover is retained in press-on pry-off relation by the fingers.

6. In a wheel structure including a tire rim and a supporting body member with openings within the wheel adjacent juncture of the rim and body member, a cover for disposition at the outer side of the wheel comprising a cover plate with retaining fingers struck therefrom and extending generally axially inwardly therefrom for projection into the wheel openings, said fingers having generally axially inwardly directed legs with axially outwardly return bent flexible terminal legs provided with short and stiff generally radially extending extremities for retaining engagement at their tips with a generally radially oppositely facing flange at said openings, whereby the cover is retained in press-on pry-off relation by the fingers, the side edges of said fingers being inclined toward each other.

References Cited in the file of this patent

UNITED STATES PATENTS

| | | |
|---|---|---|
| 1,800,173 | Anderson | Apr. 7, 1931 |
| 2,198,056 | Lyon | Apr. 23, 1940 |
| 2,312,568 | Lyon | Mar. 2, 1943 |
| 2,368,238 | Lyon | Jan. 30, 1945 |
| 2,406,390 | Lyon | Aug. 27, 1946 |